UNITED STATES PATENT OFFICE.

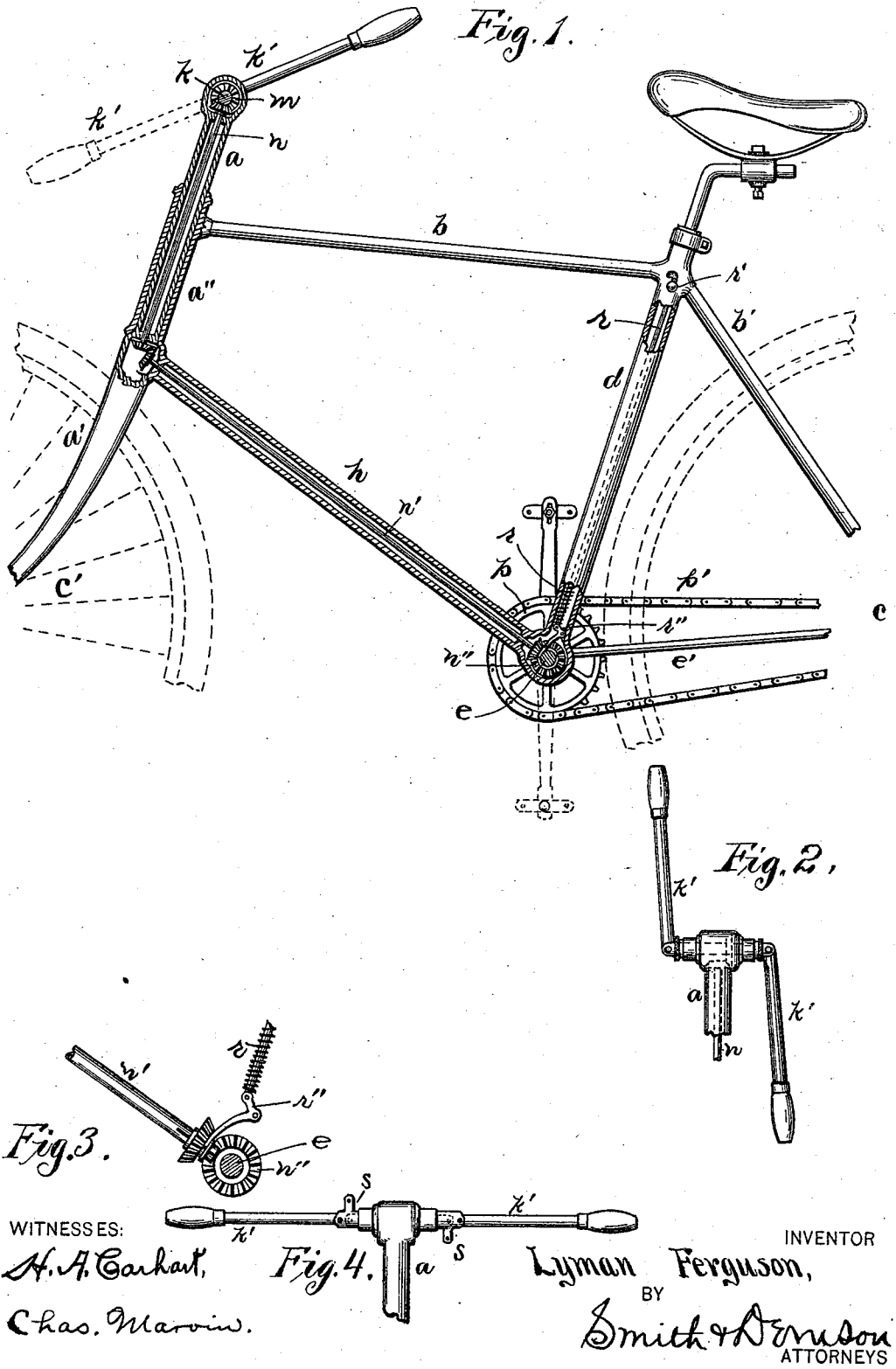

LYMAN FERGUSON, OF SYRACUSE, NEW YORK, ASSIGNOR OF ONE-THIRD TO ERNEST YOUNG, OF SAME PLACE.

BICYCLE.

SPECIFICATION forming part of Letters Patent No. 528,423, dated October 30, 1894.

Application filed January 22, 1894. Serial No. 497,589. (No model.)

*To all whom it may concern:*

Be it known that I, LYMAN FERGUSON, of Syracuse, in the county of Onondaga, in the State of New York, have invented new and useful Improvements in Bicycles, of which the following, taken in connection with the accompanying drawings, is a full, clear, and exact description.

My invention relates to that class of vehicles known as combined hand and foot propelled safeties.

My object is to produce a mechanism by which the safety can be driven by both hand and foot power simultaneously, or by either one alone, or independent of the other.

With these ends in view my invention consists in the combination with the frame of a bicycle and a pedal shaft connected with the rear driving wheel of a geared and gear driven shaft inclosed within the steering post and actuated by means of handle bars when they are converted into cranks, said shaft being adapted to drive another geared shaft which is inclosed in the brace extending from said post to the seat-supporting post in the frame and detachably engaging with and driving the pedal shaft; means being provided, inclosed within the seat-post, whereby the hand propelling mechanism can be shifted out of gear or engagement with the foot propelling mechanism, and the cranks converted into handle-bars for steering purposes, when the safety is driven by foot power alone; in which, when the feet are removed from the pedals the safety is driven by hand power alone, the handle-bar having been converted into driving cranks.

My invention consists in the several novel features of construction and operation hereinafter described and which are specifically set forth in the claims hereunto annexed.

It is constructed as follows, reference being had to the accompanying drawings, in which—

Figure 1, is a side elevation of part of a safety, showing parts of the frame in section and parts broken away. Fig. 2, is a top plan of the handle bar converted to cranks, the steering head and part of the steering post and driving shaft. Fig. 3, is a plan of either end of either drive shaft and the bevel-gear thereon. Fig. 4, is a detail in top plan of the steering head and handle bar, and one style of connection to hold the sections extended.

The frame shown consists of the steering post —a—, fork —a'—, head —a"—; —b— b— being the top braces, —b'— the rear brace extending down to the bearing for the rear wheel —c—, the front wheel —c'— being journaled in the fork in the usual manner; the tubular seat post —d— connected at the top to both of said braces and at the lower end to the bearing for the pedal shaft —e—. —e'— is the rod connecting said bearing to the bearing of the rear wheel; and —h— is the tubular (or solid) lower frame bar connecting the pedal-shaft bearing to the steering post or the sleeve around it.

The handle bar —k— is constructed in sections the central one being journaled in the head, and provided with a bevel-gear —m—, while the sections —k'— of said bar are hinged to the central section in such manner that they can be shifted and converted into cranks to drive said gear within said head.

In the steering post a shaft —n— is mounted provided with a bevel gear on each end, and in the frame bar —h—, a shaft —n'— is mounted provided at each end with a bevel gear, the one at the rear end engaging with the gear —n"— on the pedal shaft, so that by the rotation of the handle bar cranks and the intermediate shafts and gears the pedal shaft is rotated, to drive the sprocket —p— and belt —p'— to rotate the rear wheel, and thus propel the safety by hand power, or by combined hand and foot power, the latter being applied to the pedals in the usual manner.

In the post —d— the rod —r— is mounted, provided at its upper end with a handle —r'— projecting out through said post, and having its lower end connected to the bell-crank shifter —r"— pivoted in said post, or in the case inclosing the gearing which drives the pedal shaft, said bell-crank having one arm connected to the gear on the shaft —n'— engaging with the gear —n"— in such manner that by moving said rod vertically the former gear is shifted out of engagement with the gear —n"— to drive the safety by foot power only, or thrown back into engagement to drive it by both foot and hand power; said gear being connected to said shaft —n'— by a spline and feather-way joint and being free to be traversed thereon.

In Fig. 4, I show a pin and catch connection —s— to hold the handle bar sections extended, the outer pin being removable, and also adapted to be shifted and inserted through the arms —s'— to hold the sections into position as cranks. Any other equivalent mechanism can be used for this purpose of holding said sections in either position for either purpose to which they are converted.

What I claim as my invention, and desire to secure by Letters Patent, is—

1. In a bicycle the combination with a frame, and a driving shaft connected with the rear driving wheel, and having the pedals secured thereto, of a beveled gear secured on said shaft, in line with the lower end of the seat post and one of the bars of the frame, a shaft arranged within one of the tubular bars of the frame and provided at one end with a longitudinally movable gear that meshes with the gear on the pedal and driving shaft and at its outer end with a similar gear that meshes with a gear arranged in the head of the frame, means for revolving the gear in the head of the frame, a bell crank lever fulcrumed within the tubular seat post and having one arm connected with an operating rod and its other end engaging with the gear at the lower end of the shaft in the frame, substantially as shown and described, for the purpose specified.

2. In a propulsion device for bicycles, the combination with a pedal or driving shaft, of a beveled gear secured on said shaft in line with the lower end of the tubular seat post and inclined bar connecting said post with the head of the machine, a shaft arranged in the head and provided at its ends with bevel gears, connections between the upper gear on said shaft and suitable crank arms, a shaft mounted within the inclined bar of the frame and provided at its upper end with a gear that meshes with the gear on the lower end of the shaft in the head of the frame and at its other end with a longitudinally movable gear on the pedal shaft, a bell crank lever fulcrumed within the seat post and having an arm engaging with the longitudinally movable gear in the inclined bar of the frame, a rod arranged within the seat post and connected at its lower end with the other arm of the bell crank lever, and a handle connected with the upper end of said rod and extending through the seat post, substantially as shown and described, for the purpose specified.

In witness whereof I have hereunto set my hand this 28th day of August, 1893.

LYMAN FERGUSON.

In presence of—
C. W. SMITH,
HOWARD P. DENISON.